United States Patent [19]

Chen

[11] Patent Number: 5,059,947
[45] Date of Patent: Oct. 22, 1991

[54] VEHICLE BRAKE WARNING DEVICE

[76] Inventor: Shih-Chiang Chen, No. 42, Hua-Hsin Rd., Ling-Ya Dist., Kaohsiung City, Taiwan

[21] Appl. No.: 495,608

[22] Filed: Mar. 19, 1990

[51] Int. Cl.$^5$ .............................................. B60Q 1/50
[52] U.S. Cl. ............................ 340/467; 200/61.45 R; 340/464
[58] Field of Search ....................... 340/467, 464, 479; 200/61.45 R, 61.45 M, 61.47, 61.52

[56] References Cited

U.S. PATENT DOCUMENTS

| | | | |
|---|---|---|---|
| 3,332,060 | 7/1967 | Liljequist | 340/467 |
| 3,519,987 | 7/1970 | Jania | 340/467 |
| 3,593,278 | 7/1971 | Bower et al. | 340/467 |
| 3,665,391 | 5/1972 | Bumpous | 340/467 |
| 4,384,269 | 5/1983 | Carlson | 340/467 |
| 4,667,177 | 5/1987 | Athalye | 340/479 |
| 4,800,377 | 1/1989 | Slade | 340/467 |
| 4,920,330 | 4/1990 | Plozner | 340/467 |
| 4,983,953 | 1/1991 | Page | 340/479 |

Primary Examiner—Jin F. Ng
Assistant Examiner—Brent A. Swarthart
Attorney, Agent, or Firm—Oblon, Spivak, McClelland, Maier & Neustadt

[57] ABSTRACT

A vehicle brake warning device for use in a vehicle with a brake pedal includes a detector for producing different electrical signals in response to the magnitude of the inertia force experienced during braking, a control circuitry receiving signals from the detector and having a varying frequency output depending upon the received signal, and a warning device activated by the varying frequency output of the control circuitry. Whenever a pressing force is exerted on the brake pedal to reduce the speed of the vehicle, the detector experiences an inertia force whose magnitude depends upon the speed of the vehicle. The detector sends out an appropriate signal dependent upon the magnitude of the inertia force to the control circuitry. The control circuitry activates the warning device to send out a warning signal which varies depending upon the magnitude of the inertia force.

2 Claims, 4 Drawing Sheets

VEHICLE BRAKE WARNING DEVICE

BACKGROUND OF THE INVENTION

The invention relates to a vehicle brake warning device, more particularly to a vehicle brake warning device sending out warning signals which vary according to the speed of the vehicle when the brakes are applied.

The brake lights of a vehicle are used to warn the rearward vehicles that the vehicle is going to reduce its speed. A switch is actuated by a brake pedal of the vehicle whenever a pressing force is applied to the same. The switch electrically connects the brake lights of the vehicle to the car battery, thus operating the brake lights. However, mere signaling that the vehicle is about to reduce its speed does not provide information to the rearward vehicles as to the current speed of the vehicle. It is believed that providing the drivers of the rearward vehicles with information as to the current speed of the vehicle in front will enable them to make quicker decisions and faster responses.

SUMMARY OF THE INVENTION

Therefore, the object of this invention is to provide a vehicle brake warning device which has a varying warning signal output depending upon the speed of the vehicle when the brakes are applied.

Accordingly, a vehicle brake warning device for use in a vehicle with a brake pedal comprises: a detector for producing different electrical signals in response to the magnitude of the inertia force experienced during braking; a control circuitry which receives signals from the detector and has a varying frequency output which depends upon the received signal; and a warning device activated by the varying frequency output of the control circuitry.

The detector comprises a housing, a switch actuator, an inclined support plate, and a plurality of switches mounted to the support plate at predetermined positions. The housing has an inclined rail adjacent to and along the length of said support plate to hold and guide the switch actuator. Whenever a pressing force is exerted on the brake pedal to reduce the speed of the vehicle, the detector experiences an inertia force whose magnitude depends upon the speed of the vehicle. The inertia force experienced causes the switch actuator to selectively move one of the switches for actuation.

The control circuitry comprises a capacitor and a plurality of resistors having different resistances, the resistors being respectively connected in series with the switches. The capacitor has a charging time which depends upon the resistance of the resistor in series with the switch actuated by the switch actuator. The charge and discharge action of the capacitor varies the frequency output of the control circuitry.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 1:
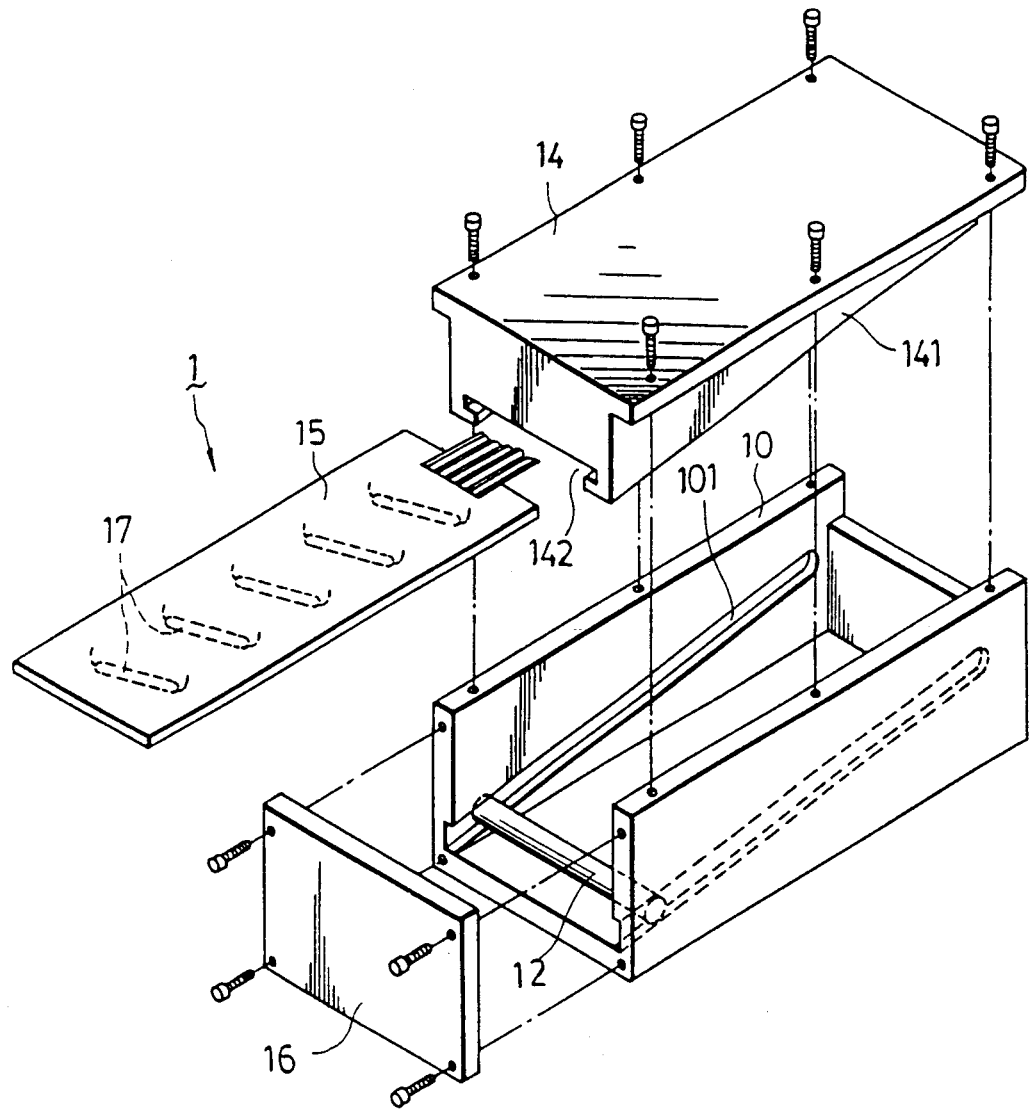
FIG. 1 is an exploded view of a detector according to this invention.

Referring to FIG. 1, a detector 1 of a vehicle brake warning device according to this invention comprises a housing 10 formed as a hollow rectangular body, a switch actuator 12 (an example of which is a cylindrical magnet), a top cover 14, a support plate 15, a side cover 16, and a plurality of switches 17 (examples of which are magnetic switches). The housing 10 has a pair of inclining longitudinal rail grooves 101 disposed on opposite sides of the same. The switch actuator 12 has two ends movably received by the rail grooves 101. The top cover 14 has a pair of oppositely disposed side faces 141 with inclining flanged edges serving as retaining grooves 142. The degree of inclination of the retaining grooves 142 is the same as that of the rail grooves 101. The support plate 15 is held by the retaining grooves 142. The switches 17 are aligned and positioned on the support plate 15 sequentially at predetermined intervals from the bottom side of the support plate 15 to the top side thereof. For the purpose of clarification, the switches 17 positioned on the support plate 15 are identified as $S_1$, $S_2$, $S_3$, $S_4$, $S_5$.

Figure 2:
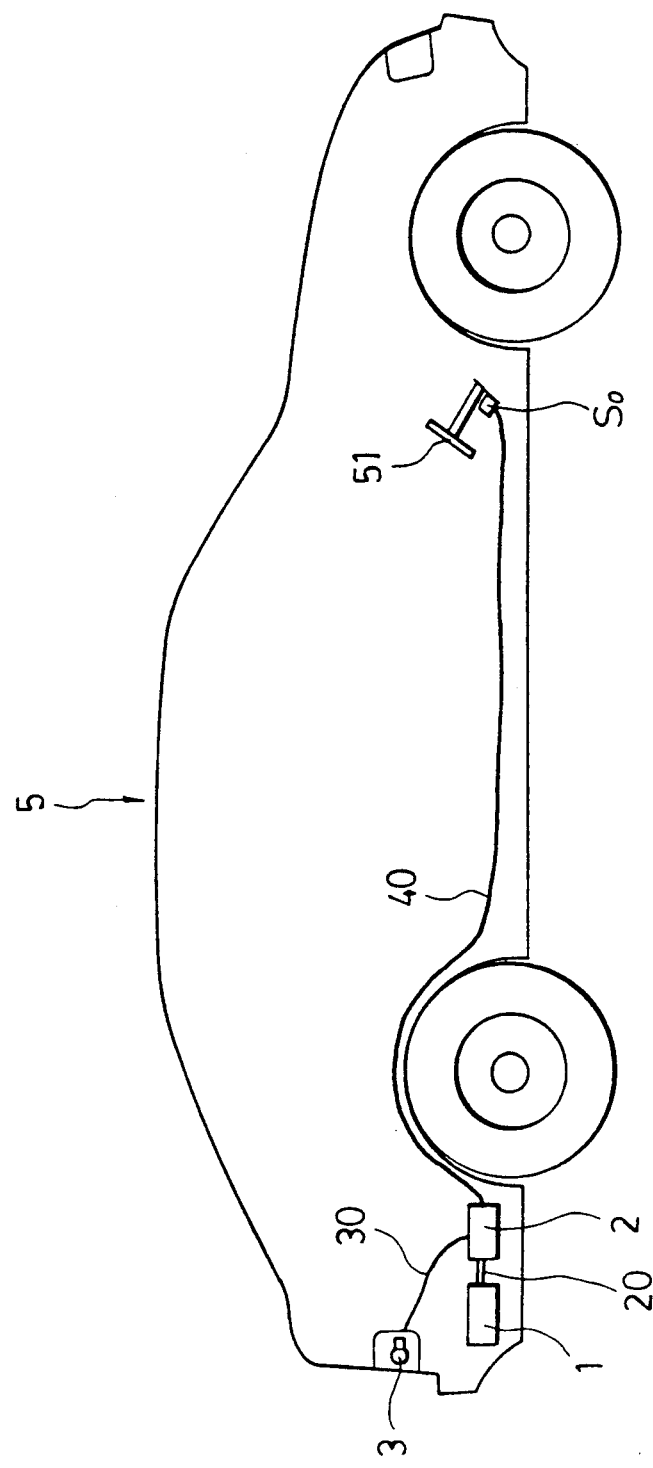
FIG. 2 illustrates a layout of the preferred embodiment when in use in a vehicle.

FIG. 2 shows a layout of the preferred embodiment when in use in a vehicle 5. The housing 10 of the detector 1 is fixedly mounted to the base of a trunk compartment of the vehicle 5 and parallel to the longitudinal axle of the same. The highest point of the rail grooves 101 is facing the front end of the vehicle 5. A circuit casing 2 is disposed in front of the detector 1. The switches 17 are electrically connected to a control circuitry found inside the circuit casing 2 by a plurality of conducting wires 20. The brake lights 3 are similarly electrically connected to the control circuitry by conducting wires 30. The brake lights 3 serve as a warning device for this embodiment. A conducting wire 40 electrically connects the circuit casing 2 to a switch $S_0$ provided below a brake pedal 51 of the vehicle 5. The switch $S_0$ is closed only when a pressing force is applied on the brake pedal 51.

Figure 3:
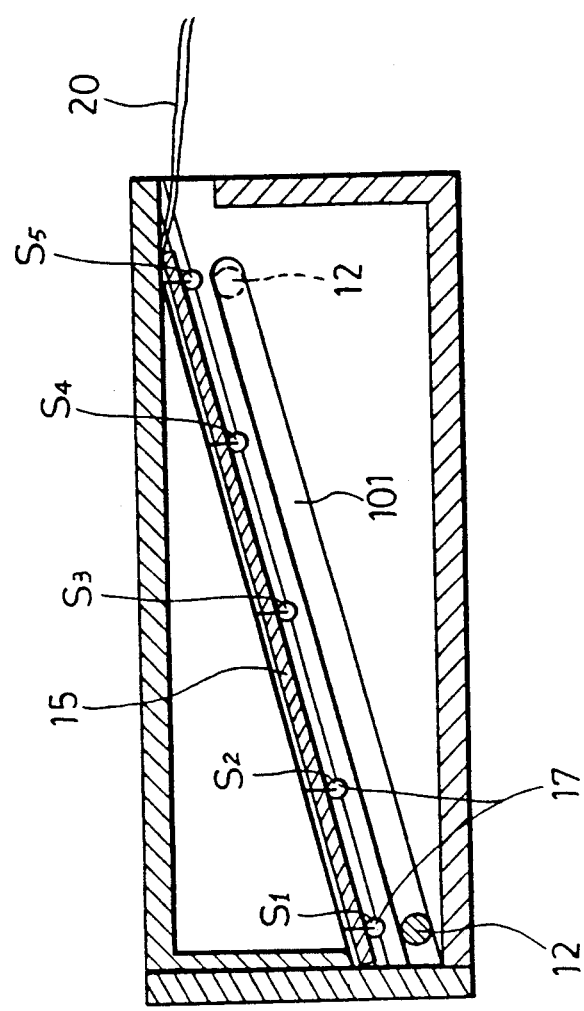
FIG. 3 is a sectional view of an assembled detector according to this invention.

Referring to FIG. 3, the bottom surface of the support plate 15 is adjacent to the rail grooves 101. The movement of the switch actuator 12 along the rail grooves 101 depends upon the braking speed or the speed of the vehicle 5 when the brakes are applied. If the braking speed is fast, the inertia force acting on the switch actuator 12 moves the same to the highest point on the rail grooves 101, directly below the switch $S_5$. Different amounts of inertia force acting on the switch actuator 12 vary the position of the same on the rail grooves 101.

Figure 4:
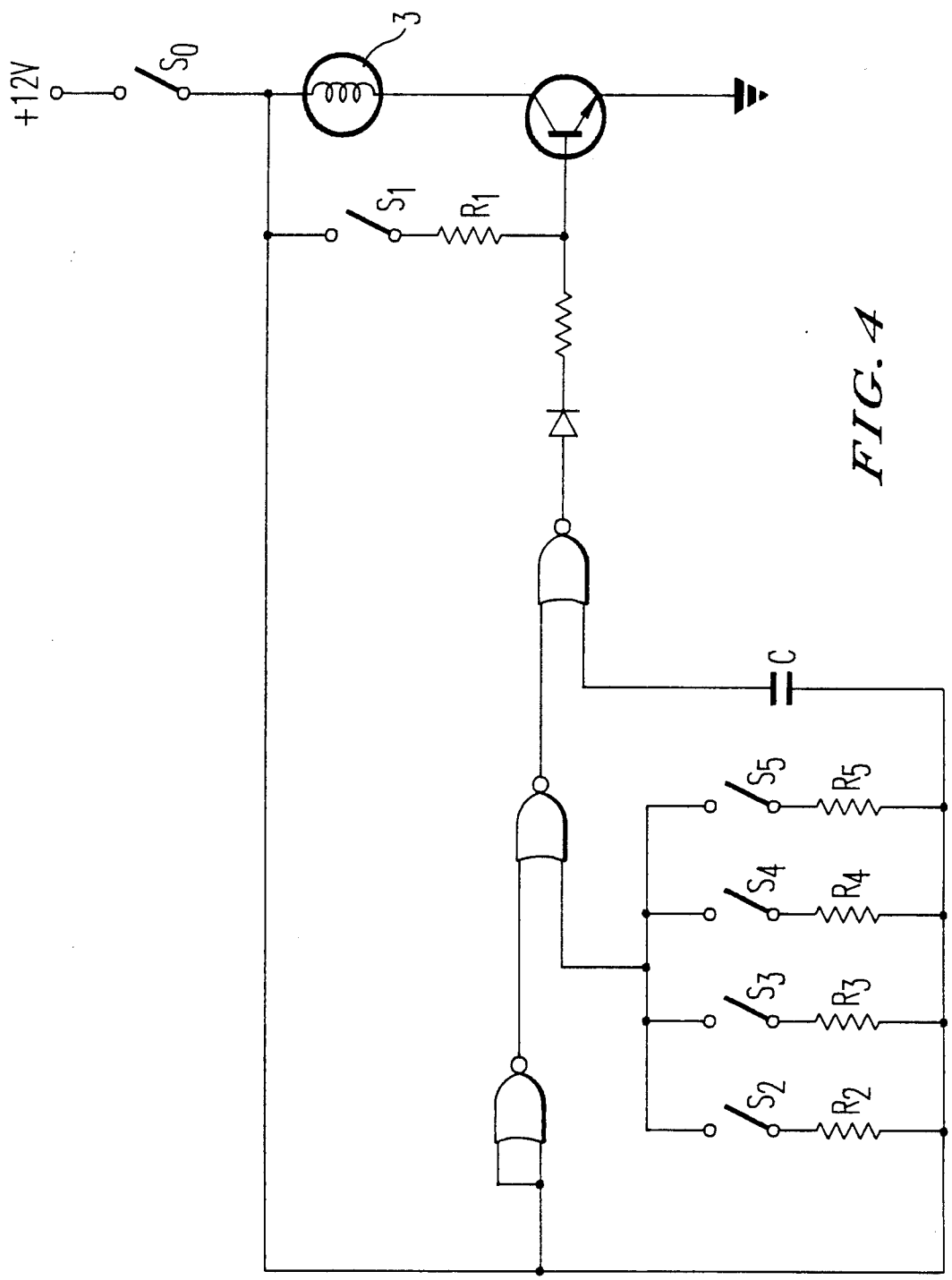
FIG. 4 is a schematic circuit diagram of a control circuitry according to this invention.

FIG. 4 is a control circuitry of the vehicle brake warning device according to this invention. When a pressing force is applied to the brake pedal 51, the switch $S_0$ is moved to a closed position and electrically connects a +12 volt car battery to the control circuitry. Current is thus supplied to turn ON the warning device 3. Should the brake pedal 51 be pressed when the vehicle 5 is moving, any object, including the switch actuator 12, which is not fixed to the frame of the vehicle 5, moves because of the presence of an inertia force. If the braking speed of the vehicle 5 is fast, the inertia force is large, and the distance traveled by the switch actuator 12 in the rail grooves 101 is long. If the braking speed of the vehicle 5 is slow, the inertia force is less, and the distance traveled by the switch actuator 12 in the rail grooves 101 is shorter. The switch actuator 12 thus actuates a particular switch 17 for a range of inertia force. The switches $S_2$, $S_3$, $S_4$, $S_5$ are respectively in series with resistors $R_2$, $R_3$, $R_4$, $R_5$. The ohmic resistance of the resistors $R_2$, $R_3$, $R_4$, $R_5$ are of different magnitudes and follow the mathematical relation $R_2 > R_3 > R_4 > R_5$. The resistors $R_2$, $R_3$, $R_4$, $R_5$ are used in determining the charging time of a capacitor C. The charging time of the capacitor C is the product of the capacitance of the capacitor C and the resistance of the resistor in series with the switch 17 actuated by the switch actuator 12. The charge and discharge action of the capacitor C interrupts the supply of current to the warning device 3, thus allowing the warning device 3 to operate in a blinking manner. If the charging time of the capacitor C is relatively long, the interval of blinking of the warning device 3 is also long, and the frequency of blinking is relatively low. If the charging time of the capacitor C is relatively short, the interval of blinking of the warning device 3 is also short, and the frequency of blinking of the same is relatively high. The frequency of blinking of the warning device 3 thus depends on which switch 17 was actuated by the switch actuator 17. The frequency of blinking follows the mathematical relation $S_5 > S_4 > S_3 > S_2$. If the braking speed of the vehicle 5 is relatively slow, it is possible that no blinking of the warning device 3 occurs. This happens only when switch $S_1$ is actuated. The preferred embodiment thus serves to warn and indicate to the rear vehicles the speed of the vehicle 5 using the embodiment.

The warning device according to this invention should not be limited to the brake lights as used in this embodiment. The warning device of this embodiment can be replaced by a plurality of sequentially arranged light devices. A slight modification of the control circuitry will allow the light devices to provide a visual representation of the braking speed of the vehicle. The warning device of this embodiment can be similarly replaced by a sound system. A slight modification of the control circuitry would enable the same to transmit various frequencies for different braking speeds. The above mentioned modifications are widely known and will not be further discussed.

The preferred embodiment may be further modified by using a movable mercuric body as the switch actuator 12 and mercury sensitive photoswitches to replace the switches 17 of this embodiment. The movement of the mercuric body still depends on the amount of inertia force present and the operation of the warning device 3 of this invention is still the same.

While the present invention has been described in connection with what is considered the most practical and preferred embodiment, it is understood that this invention is not limited to the disclosed embodiments, but is intended to cover various arrangements included within the spirit and scope of the broadest interpretation so as to encompass all such modifications and equivalent arrangements.

I claim:

1. A vehicle brake warning device for use in a vehicle with a brake pedal, comprising:

a detector for producing different electrical signals in response to the magnitude of the inertia force experienced during braking, said detector including a rolling switch actuator and a plurality of switches at different predetermined positions, the inertia force experienced during braking causing said switch actuator to selectively move one of said switches for actuation; a housing and an inclined support plate in said housing to hold said switches, said housing having an inclined rail extending adjacent to and along the length of said support plate to hold and guide said switch actuator, said switch actuator being moved along said rail by a distance depending upon the magnitude of the inertia force;

a control circuitry electrically connected to said detector and receiving said electrical signals from the same, said control circuitry having an output dependent upon said signals, wherein said control circuitry includes a capacitor and a plurality of resistors having different resistances, said resistors being respectively connected in series with said switches, said capacitor having a charging time which depends upon the magnitude of the resistance of the resistor in series with one of the switches actuated by said switch actuator, said output of said control circuitry depending upon said charging time of said capacitor; and a warning device activated by said output of said control circuitry;

whenever a pressing force is exerted on said brake pedal to reduce the speed of said vehicle, said detector experiences an inertia force whose magnitude depends upon the speed of said vehicle, said detector sends out an appropriate signal dependent upon the magnitude of the inertia force to said control circuitry, said control circuitry activating said warning device to send out a warning signal which depends upon the magnitude of the inertia force.

2. A vehicle brake warning device as claimed in claim 1, wherein said warning device further comprises a plurality of sequentially arranged light devices, said control circuitry activating said light devices to provide a visual representation of the magnitude of said inertia force.

* * * * *